(12) United States Patent
Yamamoto

(10) Patent No.: US 6,402,325 B1
(45) Date of Patent: Jun. 11, 2002

(54) ILLUMINATING OPTICAL SYSTEM HAVING MULTIPLE LIGHT SOURCES AND LENTICULAR ARRAYS FOR USE WITH A PROJECTION-TYPE DISPLAY UNIT

(75) Inventor: Chikara Yamamoto, Urawa (JP)

(73) Assignee: Fuji Photo Optical Co., Ltd., Saitama City (JP)

(*) Notice: Subject to any disclaimer, the term of this patent is extended or adjusted under 35 U.S.C. 154(b) by 0 days.

(21) Appl. No.: 09/548,628

(22) Filed: Apr. 13, 2000

(30) Foreign Application Priority Data

Apr. 16, 1999 (JP) .......................... 11-108909

(51) Int. Cl.[7] .................. G03B 21/26; G03B 21/14; G03B 21/20; G02F 1/1335
(52) U.S. Cl. .................. 353/94; 353/20; 353/38; 353/102; 349/8; 349/9
(58) Field of Search ................ 353/38, 20, 94, 353/32, 48, 102; 349/5, 8, 9

(56) References Cited

U.S. PATENT DOCUMENTS

| | | | | |
|---|---|---|---|---|
| 5,649,753 A | * | 7/1997 | Masumoto | 353/102 |
| 6,183,093 B1 | * | 2/2001 | Sawai | 353/31 |
| 6,222,674 B1 | * | 4/2001 | Ohta | 359/618 |
| 6,224,217 B1 | * | 5/2001 | Tanaka | 353/94 |
| 6,260,972 B1 | * | 7/2001 | Robinson et al. | 353/38 |

FOREIGN PATENT DOCUMENTS

| | | | | |
|---|---|---|---|---|
| JP | H3-111806 | 5/1991 | | G02B/19/00 |
| JP | H6-265887 | 9/1994 | | G02F/1/1335 |

\* cited by examiner

*Primary Examiner*—Russell Adams
*Assistant Examiner*—Melissa Koval
(74) *Attorney, Agent, or Firm*—Arnold International; Bruce Y. Arnold

(57) ABSTRACT

An optical illumination system for a projection-type display unit is disclosed wherein multiple light sources are oriented so as to cause the optical axes of their emitted light beams to be non-parallel to one another and to overlap at a first lenticular lens array of an integrator section. The function of the integrator section is to make the light from the multiple light sources even, and to serve as a secondary light source in the projection-type display unit. The overlapping of the light beams on the first lenticular lens array of the integrator allows the optical illumination system to be more compact in three dimensions. It also allows the diameter of a polarization converter and a field lens to be made smaller. Thus, production costs are reduced without reducing the brightness of a projected image.

6 Claims, 9 Drawing Sheets

Fig. 9(b)
(Prior Art)
Fig. 9(a)
(Prior Art)
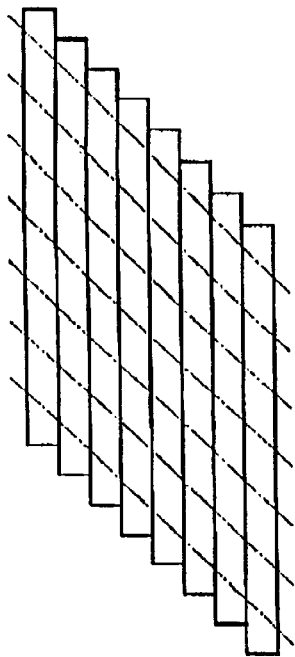
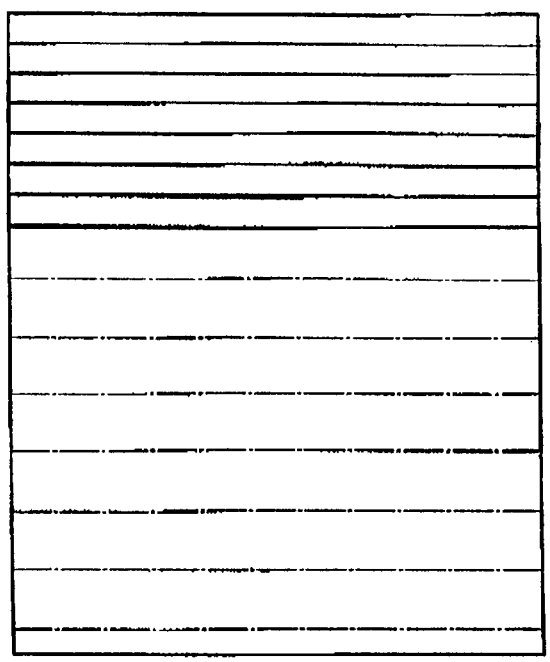
Fig. 9(c)
(Prior Art)

ILLUMINATING OPTICAL SYSTEM HAVING MULTIPLE LIGHT SOURCES AND LENTICULAR ARRAYS FOR USE WITH A PROJECTION-TYPE DISPLAY UNIT

BACKGROUND OF THE INVENTION

Traditionally, when using a light source having an output intensity that varies greatly in spatial distribution (such as with a metal halide lamp, a xenon lamp or a halogen lamp), a method using lens arrays (e.g., lenticular lens arrays arranged in series) has been used in order to eliminate the spatial irregularity in intensity of the emitted light. This method is hereinafter called the "integrator" method. Many other methods are also known in order to obtain a more even illumination, such as a light dividing technique as disclosed in Japanese Laid Open Patent Application H3-111806.

In an example of the integrator method, a prior art illuminating optical device employs, in the light path following a multiple-light-source optical illuminating device, a first lenticular lens array, a second lenticular lens array, and a field lens, respectively, in the order that the light transits each. Both lenticular lens arrays serve as a light integrator section and are constructed of multiple lens element regions arranged in a two-dimensional array. The light of a single light source, having a large spatial irregularity of luminous intensity, is projected along the optical axis of a concave mirror by being reflected at the surface of the concave mirror. The first lenticular lens array divides this single beam of light into multiple light beams, the number of which equals the number of the lens element surfaces in the first lenticular lens array. Thus, the irregularity of luminous intensity of each divided beam of the light beam will be smaller than the irregularity of luminous intensity of the single light beam before the division. Each divided light beam is then projected toward a different region of the second lenticular lens array. The second lenticular lens array and a field lens operate to direct each divided light beam so that all divided light beams overlap one another at an illuminated area, thereby achieving an even illumination in the illuminated area.

The second lenticular lens array serves as a secondary light source by positioning a projection lens so as to receive light transmitted by the second lenticular lens array. The first lenticular lens array serves as the input surface of the integrator section and the second lenticular lens array serves as the output surface of the integrator section. The multiple lens regions of the first lenticular lens array and the aperture of a light valve, such as an LCD array that is controllable by electrical signals, are arranged so as to be at conjugate points of an optical system. Thus, a projection-type display unit, such as a liquid crystal projector, can be implemented.

As described above, a projection-type display unit using two integrator surfaces that employ multiple light sources has been previously disclosed in Japanese Laid Open Patent Application H6-265887. In this publication, the light beams from the multiple light sources are parallel, or nearly parallel, with one another before being incident on the first surface of the integrator. Although this publication discloses using multiple light sources to obtain a bright image, the first integrator surface must necessarily be as large as the array of multiple light sources, and thus the over-all illuminating optical system is large and inefficient.

FIG. 12 shows an example of a prior art illuminating optical system that has multiple light sources. This illuminating optical system includes the light source device 910 and the integrator section 911. The light source device 910 is comprised of the multiple light sources 910A and 910B, which are each constructed using a lamp 904 and a reflector 901. The light sources 910A and 910B radiate light beams that are parallel, or nearly parallel, to the optical axis X of the integrator section. The integrator section 911 is constructed of a first integrator surface 911A and second integrator surface 911B. The size of the second integrator surface 911B is smaller than the size of the first integrator surface 911A. The first integrator surface 911A, which receives the light beams from the light sources 910A and 910B, must have a surface area at least as large as the sum of the surface areas of each parallel light beam. In other words, the first integrator surface must be large and have an overall shape so as to receive the output light from the array of multiple light sources. Otherwise, light will be wasted (i.e., not form part of the output light of the integrator section).

BRIEF SUMMARY OF THE INVENTION

The present invention is an illuminating optical system formed of multiple light sources and an integrator section. The integrator section of the present invention can be more compact than in the prior art, resulting in increasing the illumination efficiency, and enabling not only the lenticular lens arrays that form the integrator section to be produced at less cost but also allowing a reduction in size and cost of a polarization converter and a field lens that are commonly used with the illuminating optical system.

In the present invention, rather than the multiple light sources radiating light parallel to the optical axis of the integrator section, as in the prior art, the multiple light sources are arranged so that their output beams at least partially overlap one another on the input surface of the integrator section. This enables not only the input surface area of the integrator section to be reduced by a factor depending on the amount of overlapping, but also enables the diameter of the field lens, as well as focal length of the lens regions on the first lenticular surface to be decreased by the same factor. Since the second lenticular lens array is positioned in the focal plane of the first lenticular lens array, this enables the distance between the first and second lenticular lens arrays to be decreased by the same factor while maintaining a constant $F_{NO}$ of the illuminating optical system. Thus, the illuminating optical system can be more compact in all three dimensions, and both a polarization converter as well as a field lens that are commonly used with the illuminating optical system can be reduced in diameter by the same factor. This results in significant cost savings in producing these components.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 9(a)–9(c) illustrate how the polarization converter of FIG. 8 is constructed;

DETAILED DESCRIPTION

The illuminating optical system of the present invention is formed of an illuminating device, an integrator section and a field lens. In order to obtain a higher illumination than is possible with a single light source, the illuminating optical system employs multiple light sources that are arranged in an array, each light source being formed of a lamp and reflector. In order to make the illumination from the illuminating optical system even, an integrator section receives light on its input surface and outputs light from its output surface. The input surface and the output surface of the integrator section are each formed of lenticular lens arrays. The first lenticular lens array divides the light from each reflector into multiple beams, thereby making the spatial non-uniformity of intensity of each multiple beam less than the spatial non-uniformity present in an undivided beam from a given reflector. The second lenticular lens array images each lens element of the first lenticular lens array at infinity to thereby enable the light to efficiently pass through a polarization converter. The second lenticular lens array, in combination with additional lenses, images each lens element of the first lenticular lens array onto a light valve so as to overlap at the light valve (or light valves, in a color synthesizing system) thereby achieving an even illumination on the light valve (or light valves).

Figure 1:
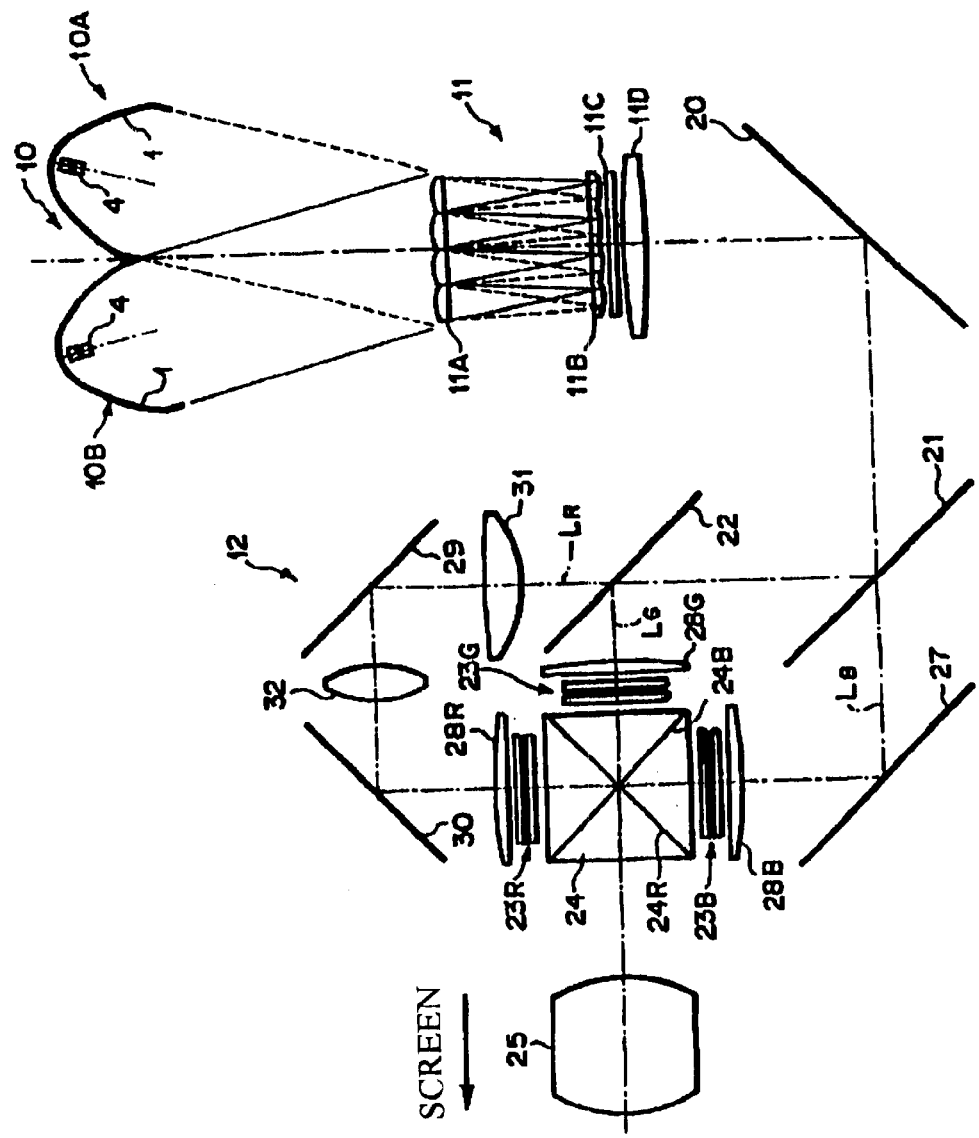
FIG. 1 shows a three-color-component, projection-type display unit that employs multiple light sources and an integrator section according to Embodiment 1 of the present invention, wherein the light beams are fully overlapped on the input surface of the integrator section.
Figure 2:
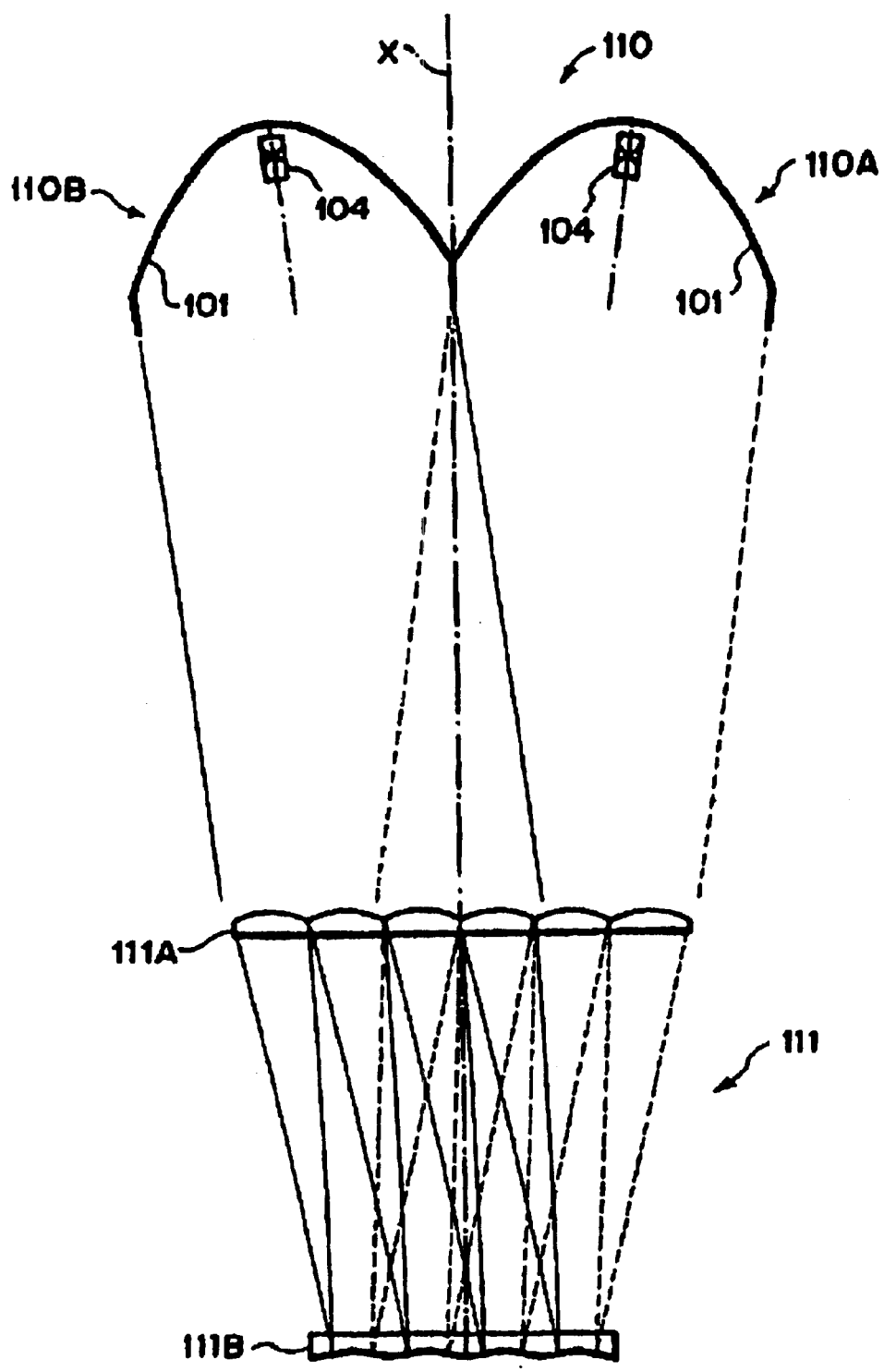
FIG. 2 shows multiple light sources and an integrator section according to Embodiment 2 of the present invention, wherein the light beams from the multiple light sources are partially overlapped on the input surface of the integrator section.

Whereas the prior art employed multiple light sources that directed their light beams parallel to the optical axis onto the input surface of the integrator section, the present invention directs the multiple light beams inward toward an optical axis of the integrator section so that the multiple light beams partially overlap (as illustrated in FIG. 2) on the input surface 111A of the integrator section, or so that the multiple beams fully overlap (as illustrated in FIG. 1) on the input surface 11A of the integrator section.

The integrator section is formed of two lenticular lens arrays arranged in series so as to receive light from the multiple light sources and to direct the light to one or more light valves which modulate the light with image information. Each lens region (i.e., lens array element) of the lenticular lens array nearest the light source device preferably has a perimeter that is rectangular. Such a shape allows for maximum light transfer efficiency, since each of these lens regions is in optical conjugate relationship to the light valve, which has an aperture that is rectangular. The divided light beams from the first lenticular lens array, by passing through the second lenticular lens array, are made to overlap on the light valve, thereby achieving an even illumination on the light valve.

Because the light beams at least partially overlap on the lenticular lens array nearest the light source side of the integrator, the size of this lenticular lens array can be reduced by a factor that is proportional to the amount of overlapping Further, each lens array element of the second lenticular lens array has a rectangular perimeter, which corresponds in shape to the rectangular perimeter of the lens array elements of the first lenticular array. In the case of one-dimensional overlapping, the ratio of height to width of each lens array element of the second lenticular lens array varies depending on whether this lens array element receives light from a first lenticular lens array element where overlapping of the input light from the light sources occurs. Where one-dimensional overlapping occurs in the width dimension, the width of the lens array elements of the second lenticular lens array which receive light from lens array elements of the first lenticular lens array that are illuminated in an overlapping manner is reduced proportionately to the amount of overlapping.

A polarization converter efficiently converts non-polarized light from multiple light sources into polarized light. It is preferable to place the polarization converter between the illuminating device and the light valve.

In addition, for each of the multiple light sources it is preferable to employ a parabolic reflector having an associated lamp at its focus. Thus, the parabolic reflector reflects the light from the associated lamp as substantially parallel rays.

Embodiments of the invention will now be explained, with reference to the drawings.

FIG. 1 illustrates the construction of the projection-type display unit according to a first embodiment of the illuminating optical system of the invention.

As illustrated in FIG. 1, the projection-type display unit is constructed of an integrator section 11 and a projector section 12. The integrator section 1I1 divides the light beams that are radiated from the illuminating device 10, and recreates a more uniform, even, spatial intensity distribution that can be used to illuminate one or more light valves. The projector section 12 projects the light output by the integrator section. The projection section is where image information is added to the light, using one or more light valves controlled by electrical signals. The image is then projected by the projection lens 25.

The illuminating device 10 is formed of multiple light source sections (e.g., in FIG. 1, light source sections 10A and 10B). Each light source section is formed of a lamp 4, such as a xenon lamp or a metal halide lamp that is positioned at the focal point of a parabolic reflector 1. Thus, substantially collimated light beams are produced by each light source section. Rather than the light source sections directing the substantially collimated light beams along the optical axis of the integrator (as in the prior art illuminator illustrated in FIG. 12), the present invention directs these beams so that they make an acute angle with the optical axis of the integrator section. The beams are thus directed so that they partially or fully overlap on the lenticular surface 11a (i.e. the lenticular surface of the integrator that is nearest the illuminating device 10).

The integrator section 11 is constructed of, in the order that light transits the components: a first lenticular lens array 11A, a second lenticular lens array 11B, a polarization converter 11C, and a field lens 11D. The function of the first and second lenticular lens arrays is the same as in the prior art. Each lens region of the first lenticular lens array 11A forms an image, of the light source or light sources that illuminate it, onto the surface of the second lenticular lens array.

Figure 12:
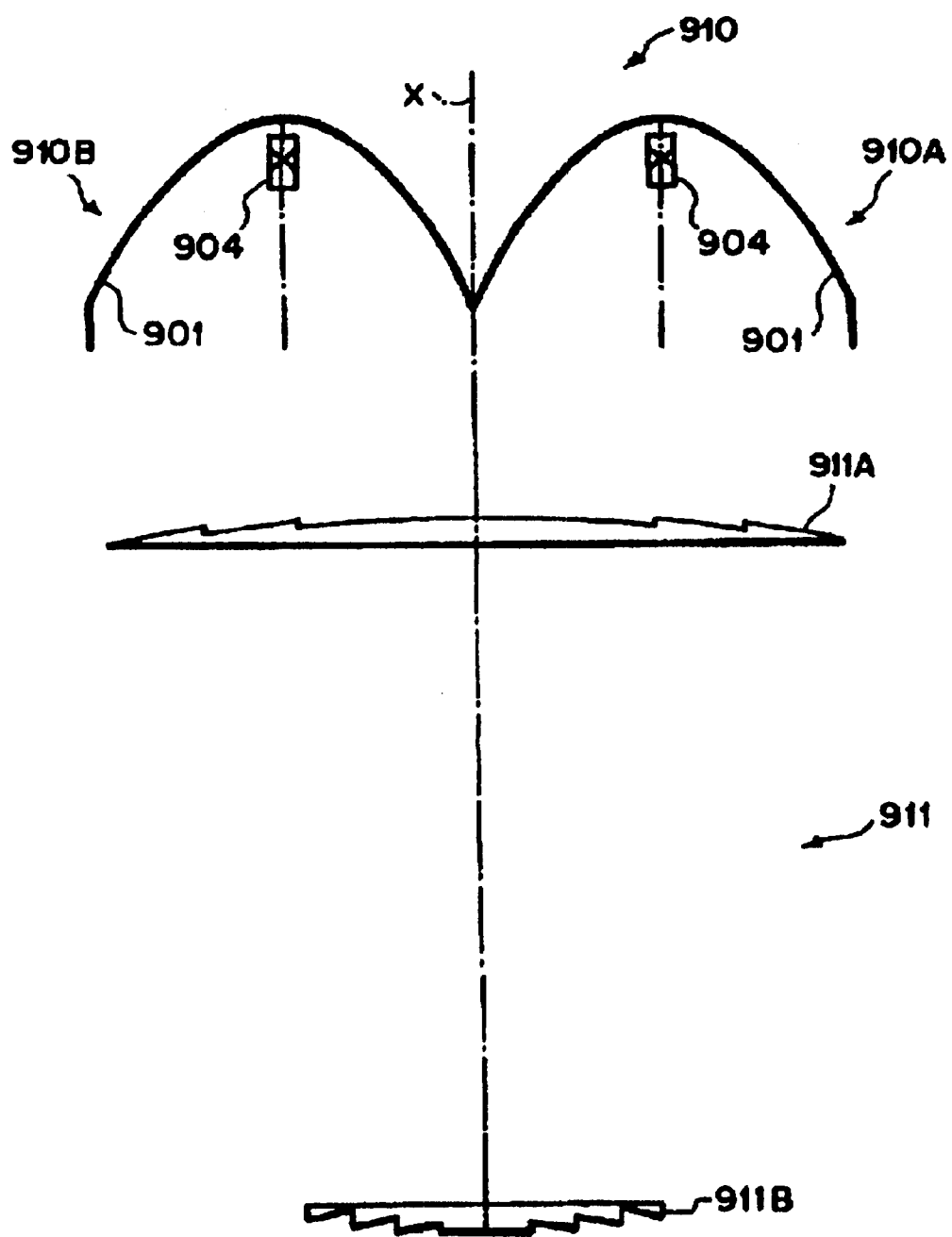
FIG. 12 illustrates a prior art illuminating optical system that uses multiple light sources.

In the prior art illuminator of FIG. 12, where there is no overlap of the light beams from different light sources on the first lenticular lens array, the number of lens elements in the second lenticular lens array equals the number of lens elements in the first lenticular lens array. The first lenticular lens array serves to divide the collimated light beams from each of the multiple light source sections into divided beams, thereby reducing the variation in spatial intensity distribution across the divided beams as compared with the variation across the undivided beams. The first lenticular lens array thus forms an image spot for each lens region (i.e., array element) of the first lenticular lens array onto a corresponding lens region (i.e., array element) of the second lenticular lens array.

Each lens region of the second lenticular lens array of the present invention images each lens region of the first lenticular lens array at infinity, thereby enabling polarization converter 11C (FIG. 1) to operate with a high efficiency of transmission. The second lenticular lens array 11B, in conjunction with positive lenses (e.g., in FIG. 1, lenses 11D and 28G) located between the second lenticular lens array and a light valve, images each lens region of the first lenticular lens array onto one or more light valves, such as 23G, 23R and 23B. The polarization converter 11C converts the non-polarized light from the second lenticular lens array 11B to linearly polarized light (of either S or P polarization).

As illustrated in FIG. 1, light source sections 10A and 10B are imaged by each lens region (i.e., each lens array element) of the first lenticular lens array onto the second lenticular lens array 11B. The projector section 12 is constructed of a dichroic mirror 21 for blue/green-red (hereinafter B/G-R) separation; a dichroic mirror 22 for green/red (hereinafter G/R) separation, liquid crystal panels 23B, 23G and 23R; a three-color-component synthesizing prism 24; and a projection lens 25. The dichroic mirror 21 divides the light beam, which is made to have an even-illumination by integrator section 11, into blue component $L_B$ and green/red components $L_G/L_R$. The dichroic mirror 22 divides the green/red components $L_G$ and $L_R$. The liquid crystal panel 23B displays the image using the blue component. Similarly, the liquid crystal panels 23G and 23R display the image using the green component and red component, respectively. The three-color-component synthesizing prism 24 synthesizes the light beam components $L_B$, $L_G$ and $L_R$ which pass through each liquid crystal panel 23B, 23G and 23R (where they are modulated with image information for that color). The projection lens 25 images the light beam, which is synthesized as a full-color image on the screen. The projector section 12 is constructed of the reflecting mirror 27, the field lenses 28B, 28G and 28R, and the reflecting mirrors 29 and 30. The reflecting mirror 27 reflects the blue component $L_B$, which is divided by the dichroic mirror 21, toward the liquid crystal panel 23B. The field lens 28B adjusts the blue component $L_B$, which is reflected by the reflecting mirror 27, so as to be a collimated beam. The field lens 28G adjusts the green component $L_G$, which is divided by the dichroic mirror 22 (for G/R separation), so as to be a collimated beam. The reflecting mirrors 29 and 30 reflect the red component $L_R$, which is divided by the dichroic mirror 22 (for G/R separation), toward the liquid crystal panel 23R. The field lens 28R adjusts the red component $L_R$, which is divided by the dichroic mirror 22 (for G/R separation), so as to be a collimated beam.

The light path length to reach the three-color-component synthesizing prism 24 for the red component $L_R$ is longer than the other paths. Field lens 31 is placed between the dichroic mirror 22 (for G/R separation) and the reflecting mirror 29. Relay lens 32 is placed between the reflecting mirror 29 and the reflecting mirror 30. The field lens 31 and the relay lens 32 correct the image relationship of the red component $L_R$.

The above-mentioned three-color-component synthesizing prism is a cross prism. It has the dichroic facets 24B and 24R. The dichroic facet 24B reflects the blue component $L_B$, and the dichroic facet 24R reflects the red component $L_R$. In addition, the reflecting mirror 20 reflects the light from the integrator section 11 toward the projector section 12.

The objective is to form a bright projected image onto a screen. In the prior art, the use of the multiple light sources requires the first and second lenticular lens arrays to be large. Thus, the illuminating optical system also must be large.

In the present invention, the light beams from the two light sources 10A and 10B are designed to partially (as in FIG. 2) or fully (as in FIGS. 1 and 3) overlap on the lenticular lens array nearest the light source device (i.e., on the input side of the integrator section). The lenticular lens array nearest the projection lens is the output side of the integrator section. As illustrated in FIG. 2, where the illuminating beams partially overlap on the lenticular lens array nearer the light source device (i.e., on the input side of the integrator section), the overall size of the lenticular lens array farther from the light source device (i.e., on the output side of the integrator section) is smaller than the overall size of the lenticular lens array nearest the light source device. Thus, the output of the integrator serves as a secondary light source for the projector.

The overall size and perimeter shape of the lenticular lens array on the input side of the integrator section is determined by the light flux at the input side. Where the light beams fully overlap on the input side of the integrator section, as in FIGS. 1 and 3, the overall size of the first lenticular lens array can be small and have a circular perimeter. This, in turn, enables the lenticular lens array on the output side of the integrator section to have a circular perimeter. Such a design enables the entrance pupil of the field lens 11D (FIG. 1) to be fully utilized (i.e., filled with light). By having the beams partially or fully overlap, the overall size of not only the lenticular lens surfaces, but also the polarization converter 11C and of the field lens 11D can be reduced by a factor proportional to the amount of overlapping. A reduction in the diameter of the field lens 11D enables its focal length to be reduced by the same factor while maintaining a constant $F_{NO}$ of the illuminating optical system. Reducing the focal length of the field lens 11D allows the focal length of each lens element region in the first lenticular lens array to be reduced by the same factor. Thus, the present invention enables the illuminating optical system to be made more compact in three dimensions.

Figure 3:
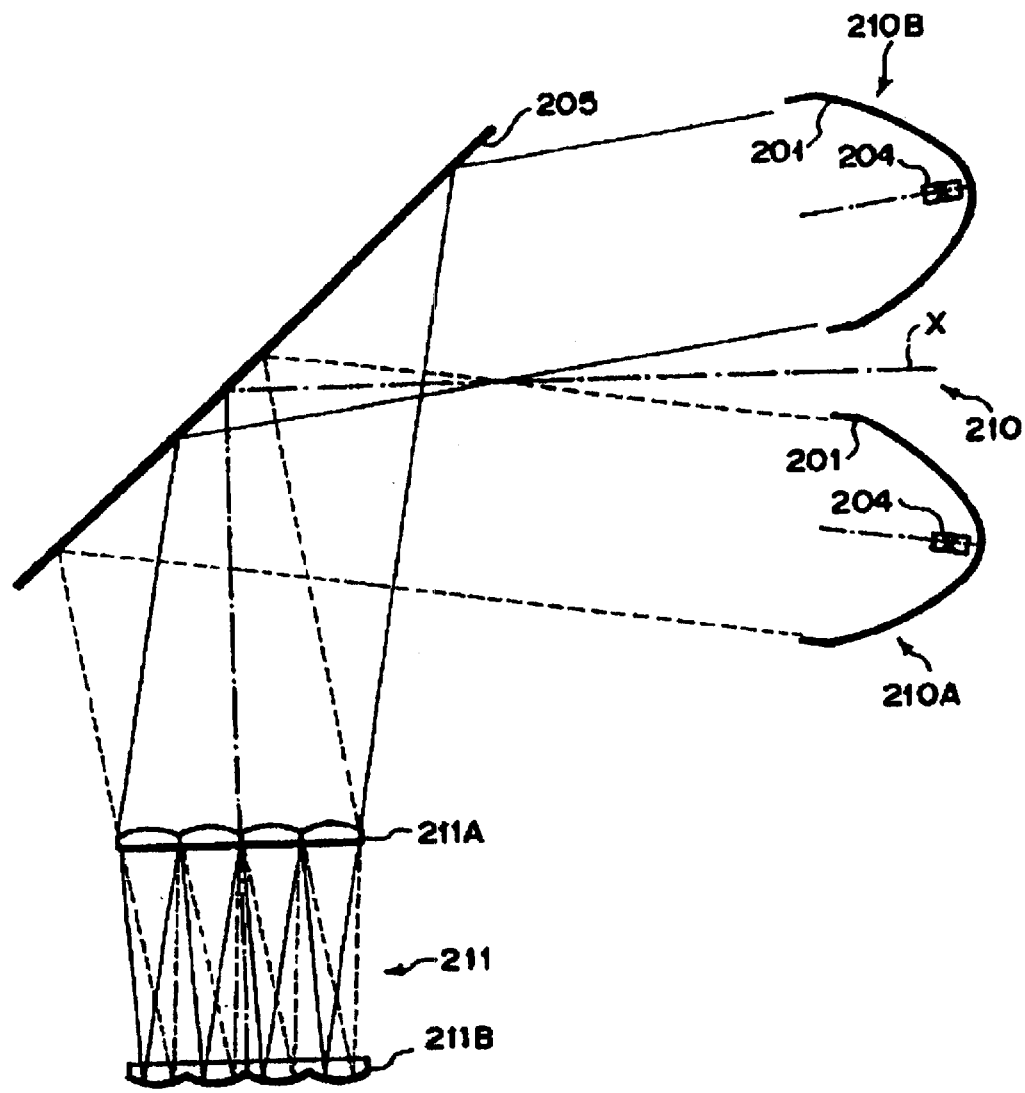
FIG. 3 shows multiple light sources, a mirror surface, and an integrator section according to Embodiment 3 of the present invention, wherein the light beams from multiple light sources are fully overlapped on the input surface of the integrator section.

In the preferred embodiments of the invention, the light beams from the two light sources 10A and 10B are designed to fully overlap each other on the first lenticular lens array (i.e., 11A in FIG. 1, and 211A in FIG. 3). This is preferable to the situation shown in FIG. 2, where the beams from the two light sources 110A and 110B only partially overlap. FIG. 3 differs from FIG. 1 only in that a beam-folding mirror 205 has been placed between the illuminating device 210 and the integrator section 211 to fold the light path.

Although only two light sources have been illustrated in FIGS. 1–3, the illuminating device can be constructed with more than two light sources. For example, four light sources may be utilized in a two-dimensional array. Obviously, such an arrangement will provide higher illumination, since more light sources are utilized.

Figure 4:
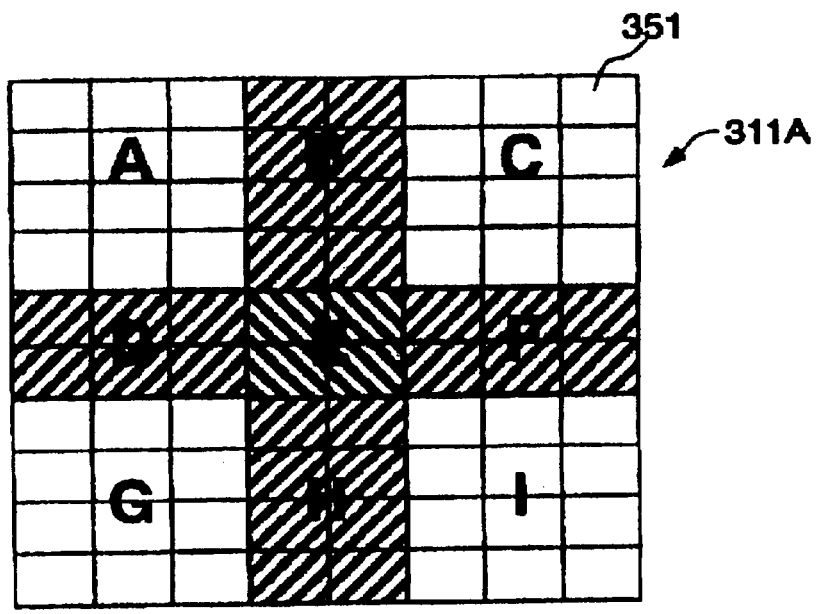
FIG. 4 illustrates a partial overlapping, in two-dimensions, of the light beams from multiple light sources on the input surface of the integrator section.
Figure 5:
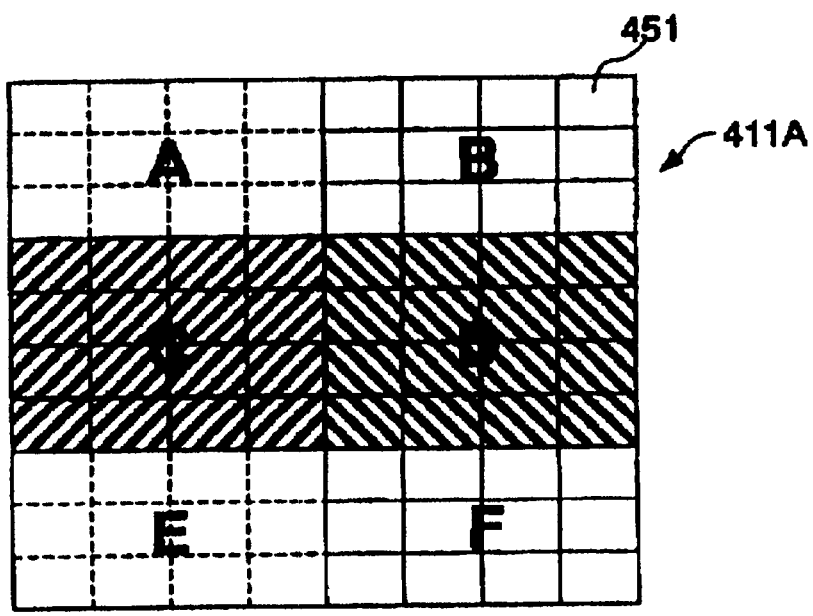
FIG. 5 illustrates a partial overlapping, in one-dimension, of the light beams from multiple light sources on the input surface of the integrator section.

FIG. 4 and FIG. 5 illustrate different examples of partial overlapping (as in the embodiment illustrated in FIG. 2) of the light beams on the first lenticular lens surface, in the case where four light sources are arranged in a two-dimensional array. FIG. 4 illustrates the light beams overlapping partially in two-dimensions on a first lenticular lens array 311A. FIG. 5 illustrates the light beams partially overlapping in a single dimension on a first lenticular lens array 411A. These lenticular lens arrays are formed of lens elements (shown as grids 351, 451). The shaded portions indicate areas where light beams from different light source sections overlap.

In other words, as illustrated in FIG. 4, the first light source section illuminates the areas A, B, D and E. The second light source section illuminates the areas B, C, E and F. The third light source section illuminates the areas D, E, G and H. The fourth light source section illuminates the areas E, F, H and I. Thus, the areas B, D, E, F and H on the first lenticular lens array 331A are enhanced with overlapping light beams.

As illustrated in FIG. 5, the first light source section illuminates the area A and C. The second light source section illuminates the area B and D. The third light source section illuminates the areas C and E. The fourth light source section illuminates the areas D and F. Thus, the areas C and D on the first lenticular lens array 411A are enhanced with overlapping light beams. The design preference is to direct multiple light sources, arranged in a two-dimensional array, at the center of the first lenticular lens array 411A.

Figure 6:
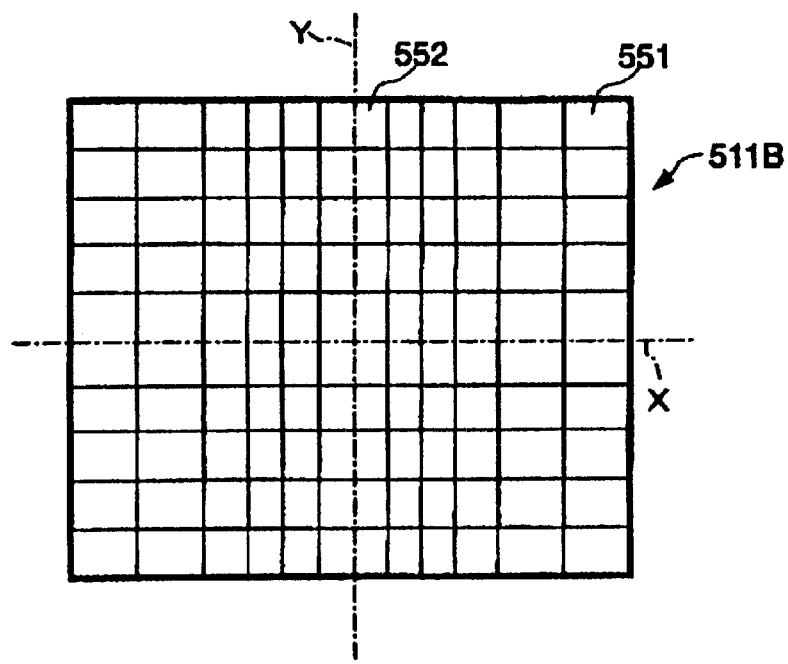
FIG. 6 is a conceptual diagram which shows the pattern of lens array elements of the lenticular surface of the integrator section that is nearest the projection lens side, when using multiple light sources that are partially overlapped on the integrator section according to Embodiment 2 of the present invention.

Next, as illustrated in FIG. 2, when the light beams partially overlap each other on the second lenticular lens array 111B of the integrator section 111, the following is characteristic of the second lenticular lens array 511B (FIG. 6). The two light source sections 110A and 110B constitute the illuminating device 110. As illustrated in FIG. 6, the pitch of the lens array elements 552 varies in the X-axis direction, becoming higher (i.e., the lens element region has less width) near the Y-axis where the second lenticular lens array receives overlapping light from two light sources. Where the light of only a single light source is incident onto the second lenticular lens array (e.g. the lens array elements 551) the pitch of the lens array elements is smaller (i.e., the lens element region has greater width).

Figure 8:
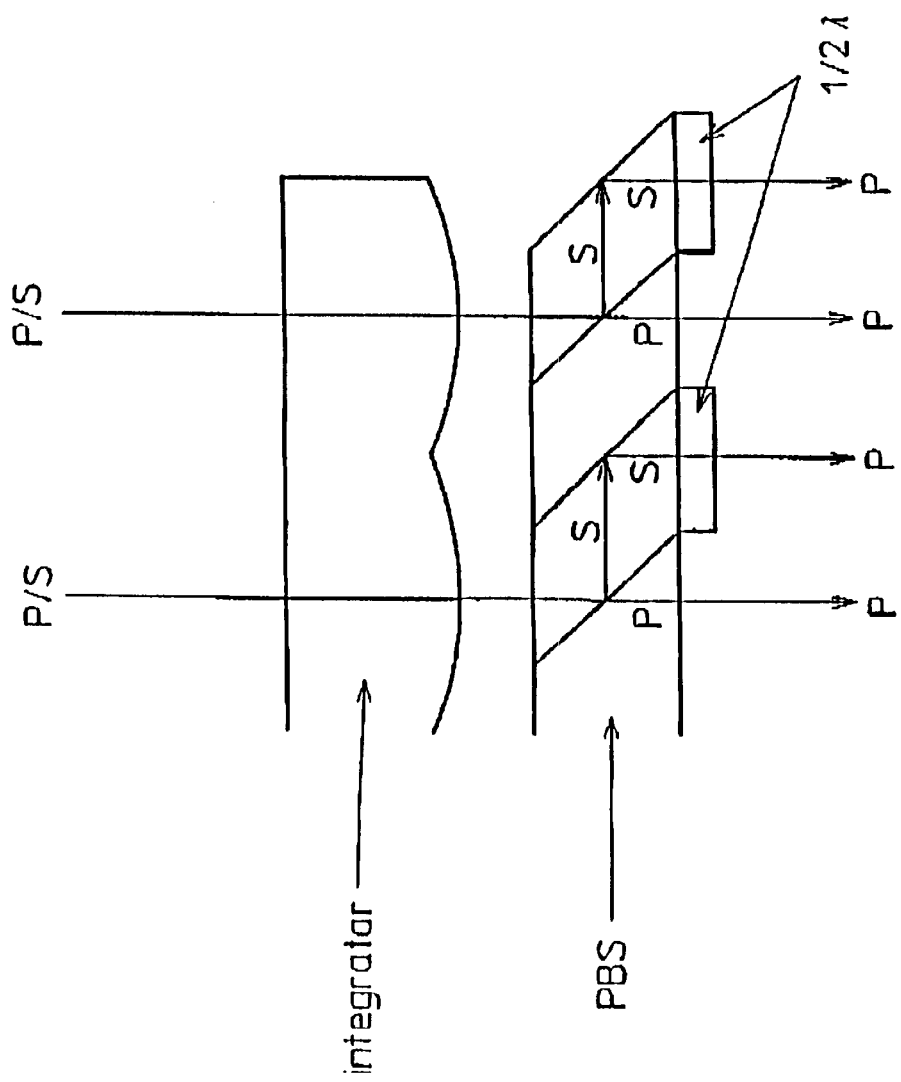
FIG. 8 illustrates, in greater detail, a side view of a prior art polarization converter, which may be formed of polarization beam splitters and half-wave plate strips, as illustrated, for converting non-polarized light from the multiple light sources into either S or P linearly polarized light with a high efficiency (see, for example, U.S. Pat. No. 5,986,809)

As shown in FIG. 1, the polarization converter 11C is placed at the projection section 12 side of the second lenticular lens array 11B. FIG. 8 illustrates the output surface of the integrator section illuminating the polarization converter with non-polarized light, which light has both P and S components. The polarization converter 11C functions, with high efficiency, to change the non-polarized light into linearly polarized light. The polarization converter efficiently realigns one of these components by converting either the P-light to the S direction, or vice-versa, so that both polarization components are aligned within a single plane, as will be discussed in detail when discussing FIGS. 8 and 9(a)–9(c).

Figure 7A:
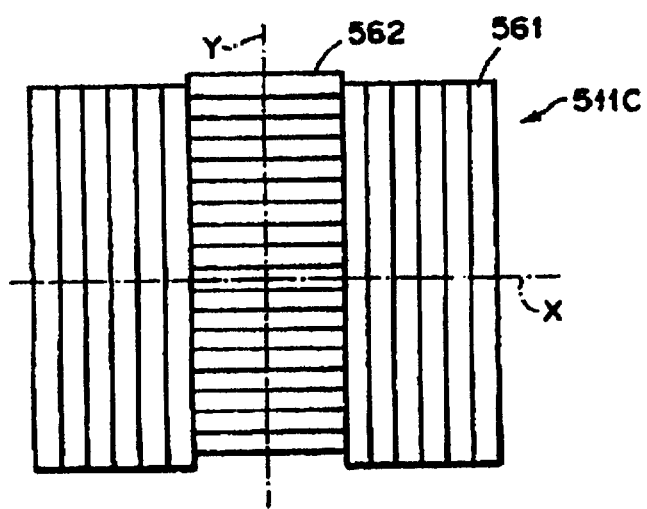
FIG. 7(a) illustrates a top view of a polarization converter which is used with the illumination optical system of Embodiment 2.
Figure 7B:
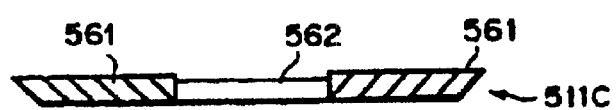
FIG. 7(b) illustrates a side view of the polarization converter of FIG. 7(a)

FIGS. 7(a) and 7(b) are top and side views of the polarization converter (item 11C in FIG. 1). The horizontal and vertical lines within the perimeter of the polarization converter illustrate the arrangement of the polarizing beam splitter (PBS) pairs. As illustrated in FIG. 7(a), at side area 561, where light beams from the two light sources 110A and 110B (FIG. 2) do not overlap, the polarizing beam splitter pairs in the polarization converter are aligned with the Y-axis. In the area 562, where the light beams from the two light sources 110A and 110B overlap, the polarizing beam splitter pairs are aligned with the X-axis.

The pitch of the polarizing beam splitter pairs in the area 562 varies in the X-axis direction and is higher (each lens array element has less width) in the area that the light beams redundantly illuminate the polarizing beam splitter. The characteristics of the polarizing beam splitter pairs, where pitch and thickness have in inverse relationship, is such that the thickness of the polarizing beam splitter pairs in the area 562 adjacent the Y-axis is less than in the areas 561. FIG. 7(b) indicates a difference of thickness between the polarizing beam splitter pairs in each area 561 and 562, as described above. When the size and arrangement for the polarizing beam splitter pairs in the polarization converter 511C are as in FIG. 7(a), an increase in light flux that exits the polarization converter results. Thus, the projected image on the screen can be brighter.

The polarization converter 511C illustrated in FIG. 7(a) indicates one example of using the two light source sections 110A and 110B. Polarizing beam splitter pairs whose arrangement direction and size are different from each other may be accordingly combined, depending on the form of each lens element of the second lenticular lens array. Therefore, it is possible that more than three light sources can be accommodated.

A parabolic reflector is used for each light source discussed above; however, this is not required. Any structure which can project a substantially collimated light beam can be used.

Depending on the relationship between the incident angle of the light beams from the light source device to the first integrator section, and the focal length of the lens array elements of the first integrator section, either one or two light source images (i.e., light spots) will be formed on each lens array element (i.e., lens region) of the second lenticular lens array (i.e., of the lenticular lens array on the output side of the integrator section). Where the beams of light overlap on the second lenticular lens array surface, two light source images may be formed on each lens element surface.

FIG. 8 illustrates in more detail the components of the polarization converter as it receives both P and S components of non-polarized light from the output surface of the integrator. The polarization converter is formed of a plate of multiple polarization beam splitters arranged at an angle to the incident radiation, as shown, with spaced half-wave-plate retarder strips arranged to receive either the twice-reflected S-component light, or the unreflected P-component light. In the illustration, the half-wave-plate strips are arranged to receive the S-component light and to retard it half a wavelength, to thereby convert the S-component light into P-component light.

The manner in which the polarization converter is constructed is illustrated in FIGS. 9(a)–9(c). In FIG. 9(a) parallel plates of glass having a reflective film that is vapor-deposited onto one surface of each plate are glued together into a block, with each plate being offset from the next, as illustrated in FIG. 9(b). The block of glass is then cut into sheets along the diagonal lines indicated in FIG. 9(b). Half-wave-plate strips (for the center wavelength of the range of incident light) are then applied to alternate regions of the polarization beam splitter (as in FIG. 9(c)), so as to convert the S-polarized light that has been twice reflected by adjacent reflective film surfaces into P-polarized light, as illustrated in FIG. 8. Alternately, the half-wave-plate strips can be applied so as to convert the P-polarized light into S-polarized light. In this manner the polarization converter uses polarization beam splitters and half-wave-plates so as to efficiently convert the non-polarized light from the integrator section into either S-polarized or P-polarized light.

Figure 10A:
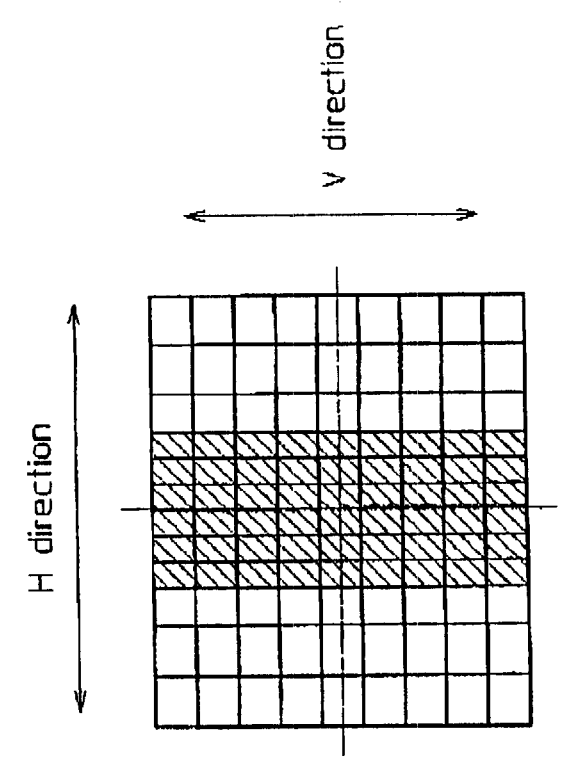
FIGS. 10(a) and 10(b) are top and side views, respectively, of the second lenticular lens array of the integrator section.
Figure 10B:

FIGS. 10(a) and 10(b) illustrate top and side views, respectively, of the second lenticular lens array, which serves as the output surface of the integrator.

Figure 11A:
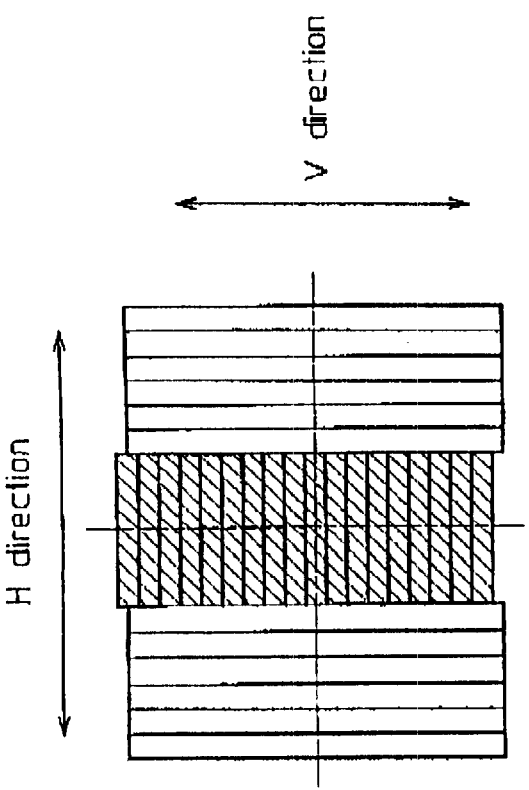
FIGS. 11(a) and 11(b) are top and side views, respectively, of a polarization converter for use with the second lenticular lens array illustrated in FIGS. 10(a) and 10(b)
Figure 11B:

FIGS. 11(a) and 11(b) illustrate the design of the polarization converter which is to be used with the second lenticular lens array shown in FIGS. 10(a) and 10(b). The shaded portions illustrated in both FIGS. 10(a) and 10(b), as well as in both FIGS. 11(a) and 11(b), are areas reached by light beams from different light sources that overlap one another on the first lenticular lens array, which serves as the input surface of the integrator.

The invention being thus described, it will be obvious that the same may be varied in many ways. Such variations are not to be regarded as a departure from the spirit and scope of the invention. Rather the scope of the invention shall be defined as set fourth in the following claims and their legal equivalents. All such modifications as would be obvious to one skilled in the art are intended to be included within the scope of the following claims.

What is claimed is:

1. An illuminating optical system comprising:

a light source device having multiple light sources, each emitting a light beam centered about an optical axis of an associated light source; and an integrator section that is illuminated by the light source device, said integrator section including two lenticular lens arrays arranged along a light path, one nearer the light source device than the other, each having multiple lens regions which together cause the light intensity distribution that is transmitted by the integrator section to be more uniform than light incident on the integrator section from said light source device;

wherein
at least two of the multiple light sources are oriented so as to cause the optical axes of the emitted light beams to be non-parallel to one another and directed so that the emitted light beams partially overlap at the lenticular lens array nearer the light source device; and each lens array element of the lenticular lens array which is farther from the light source device is smaller in area in those regions which receive light from a region of the lenticular lens array nearer the light source device and are illuminated by overlapping light beams as compared with those regions which receive light from a region of the lenticular lens array nearer the light source device and are illuminated by light from only a single light source device.

2. The illuminating optical system of claim 1, wherein each lens array element of the lenticular lens array which is farther from the light source device is rectangular in form, the ratio of height versus width of the rectangles varying depending on whether the lens array element receives light from a region of the lenticular lens array nearer the light source device that is illuminated by overlapping light beams.

3. The illuminating optical system of claim 1, and further including a polarization converter which converts non-polarized light to polarized light and is positioned between the light source device and the light valve.

4. The illuminating optical system of claim 3, wherein the polarization converter is formed of multiple sets of polarizing beam splitters with an associated half-wave plate for each set of polarizing beam splitters.

5. An illuminating optical system in combination with a projection lens system, said projection lens system including a light valve which is illuminated by the illuminating optical system, said illuminating optical system comprising:

a light source device having multiple light sources, each emitting a light beam centered about an optical axis of an associated light source;

an integrator section that is illuminated by the light source device, said integrator section including two lenticular lens arrays arranged along a light path, each said lenticular lens array having multiple lens regions which cause the light intensity distribution that is transmitted by the integrator section to be more uniform than the light incident on the integrator section from said light source device;

wherein
at least two of the multiple light sources are oriented so that the emitted light beams partially overlap at the surface of the lenticular lens array that is nearest the light source device, there also being regions of the lenticular lens array nearest the light source device which receive light from only a single light source, and for the lenticular lens array nearest the light valve, an array element which receives light from an array element of the lenticular lens array nearest the light source device and which is illuminated by overlapping light beams is smaller in size than an array element that receives light from an array element of the lenticular lens array nearest the light source device and which is illuminated by a single light source.

6. The apparatus as set forth in claim 5, wherein the lenticular lens array of the integrator section that is farther from the light source device is smaller in overall area than the lenticular lens array of the integrator section that is nearer the light source device.

* * * * *